(12) United States Patent
Nakamura

(10) Patent No.: US 11,010,347 B2
(45) Date of Patent: May 18, 2021

(54) INFORMATION PROCESSING APPARATUS WITH SERVER-LOCATION DEPENDENT TIMING, CONTROL METHOD THEREOF, AND PROGRAM

(71) Applicant: CANON KABUSHIKI KAISHA, Tokyo (JP)

(72) Inventor: Shun Nakamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1069 days.

(21) Appl. No.: 15/507,902

(22) PCT Filed: Sep. 29, 2015

(86) PCT No.: PCT/JP2015/004918
§ 371 (c)(1),
(2) Date: Mar. 1, 2017

(87) PCT Pub. No.: WO2016/067520
PCT Pub. Date: May 6, 2016

(65) Prior Publication Data
US 2017/0295234 A1    Oct. 12, 2017

(30) Foreign Application Priority Data
Oct. 31, 2014 (JP) .............................. JP2014-223191

(51) Int. Cl.
*G06F 16/178* (2019.01)
*G06F 16/30* (2019.01)

(52) U.S. Cl.
CPC ............ *G06F 16/178* (2019.01); *G06F 16/30* (2019.01)

(58) Field of Classification Search
CPC .............................. G06F 11/1068; G06F 16/27
See application file for complete search history.

(56) References Cited

U.S. PATENT DOCUMENTS 4,323,966 A * 4/1982 Whiteside ........... G06F 11/0709
714/1
5,978,813 A 11/1999 Foltz et al.
(Continued)

FOREIGN PATENT DOCUMENTS

CN          1708755 A     12/2005
CN        101790721 A      7/2010
(Continued)

OTHER PUBLICATIONS

Wyro, Are you Running Out of Disk Space Dec. 4, 2013, MDaemon technologies, http://blogs.mdaemon.com/index.php/2013/12/04/are-you-running-out-of-disk-space-4/.*
(Continued)

*Primary Examiner* — Jason G Liao
(74) *Attorney, Agent, or Firm* — Venable LLP

(57) ABSTRACT

The failure frequency of first communication at the time of activation with a setting management server arranged in the same apparatus is reduced. A client switches the timing of executing the first communication at the time of activation by whether the server is the same apparatus. If the server is the same apparatus, activation of the server is delayed and the first communication at the time of activation for synchronization is performed after the delay. The delay period is, for example, for a predetermined time or for a period until a notification from the server is received.

11 Claims, 13 Drawing Sheets

(56) References Cited

U.S. PATENT DOCUMENTS

| | | | |
|---|---|---|---|
| 7,017,071 | B2 | 3/2006 | Katayama et al. |
| 7,287,073 | B2 | 10/2007 | Katayama et al. |
| 2004/0044799 | A1 | 3/2004 | Sivaraman et al. |
| 2010/0231959 | A1 | 9/2010 | Tanikawa |
| 2012/0320415 | A1 | 12/2012 | Nakamura |
| 2016/0014575 | A1* | 1/2016 | Smith ................ H04L 67/2842 455/466 |
| 2019/0392287 | A1* | 12/2019 | Ovsiannikov ............ G06N 3/08 |

FOREIGN PATENT DOCUMENTS

| | | |
|---|---|---|
| CN | 102984416 A | 3/2013 |
| EP | 0765062 A2 | 3/1997 |
| JP | 2008-046981 A | 8/2006 |
| WO | 2004/023233 A2 | 3/2004 |

OTHER PUBLICATIONS

Wensley et al., SIFT: Design and Analysis of a Fault-Tolerant Computerfor Aircraft Control, Proceedings of the IEEE Oct. 1978, vol. 66 No. 10, 1240-55.*

Katsuki et al., Pluribus—An Operational Fault-Tolerant Multiprocessor Oct. 1978, vol. 66 No. 10, 1146-59.*

Blade Server [date unknown; captured on Jan. 21, 2021], Wikipedia, https://en.wikipedia.org/wiki/Blade_server.*

Rouse, blade server, Sep. 19, techtarget.com, https://searchdatacenter.techtarget.com/definition/blade-server.*

Chinese Office Action issued in corresponding Chinese Application No. 201580059271.7 dated Jan. 2, 2020.

International Search Report issued in International Application No. PCT/JP2015/004918 dated Dec. 21, 2015.

Unpublished, copending U.S. Appl. No. 15/411,552 to Shun Nakamura, filed Jan. 20, 2017.

\* cited by examiner

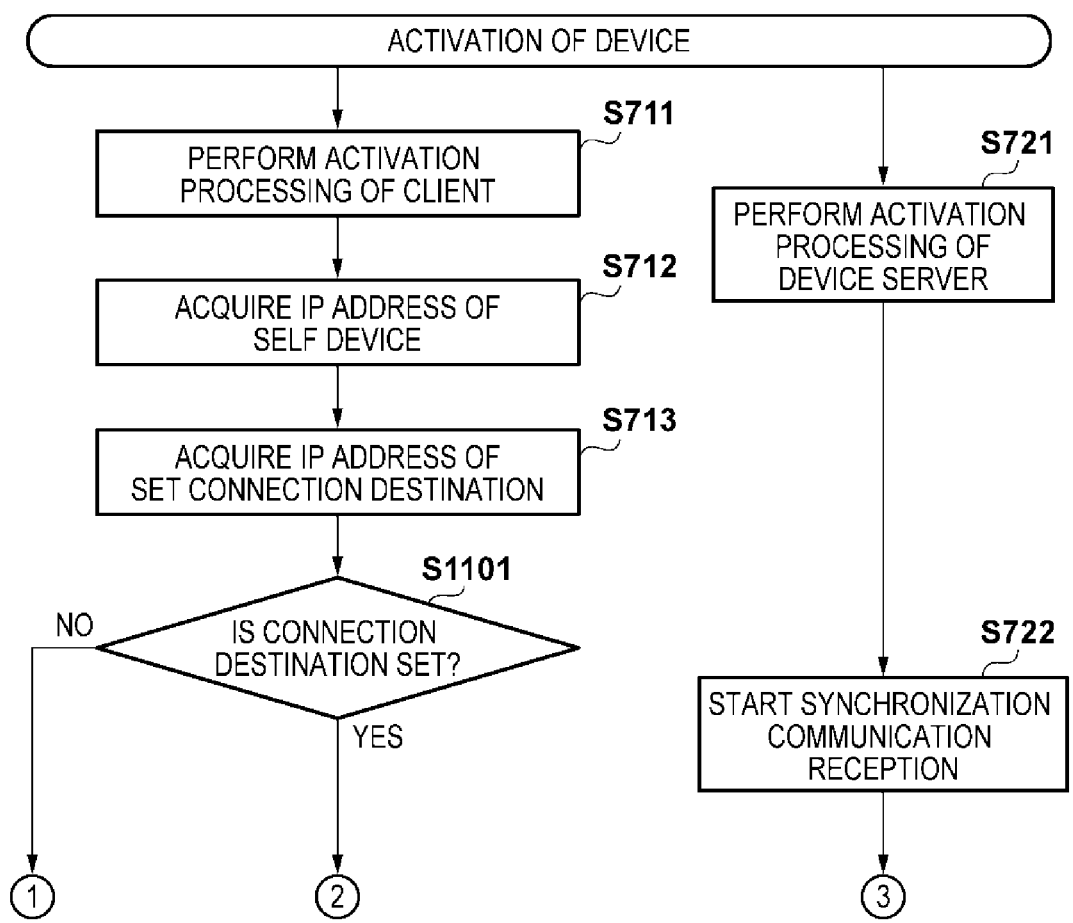

FIG. 13A

| SETTING SYNCHRONIZATION LOG | | | | |
|---|---|---|---|---|
| LEVEL | DATE/TIME | PROCESSING CONTENTS | URL | Method |
| Normal | 2013/7/7/12:56 | DEVICE SETTING 2.1kB | https://123.456.789.012/dev_data | GET |
|  |  |  |  |  |

FIG. 13B

| SETTING SYNCHRONIZATION LOG | | | | |
|---|---|---|---|---|
| LEVEL | DATE/TIME | PROCESSING CONTENTS | URL | Method |
| Warning | 2013/7/7/12:56 | DEVICE SETTING 2.1kB | https://123.456.789.012/dev_data | GET |
|  |  |  |  |  | exemplary embodiments with reference to the attached drawings.
INFORMATION PROCESSING APPARATUS WITH SERVER-LOCATION DEPENDENT TIMING, CONTROL METHOD THEREOF, AND PROGRAM

TECHNICAL FIELD

The present invention relates to a synchronization technique for synchronizing, for example, settings used for the operation of an information processing apparatus by network communication between a client and a server. The present invention particularly relates to a synchronization control technique for a case where the client and the server are arranged in the same information processing apparatus.

BACKGROUND ART

In recent years, master data of settings of a client apparatus is saved and integrally managed in a server apparatus connected through a network. These values are synchronized so that if a value in the master data on the server apparatus is changed, the client apparatus is notified of the changed value via the network and a corresponding setting of the client apparatus is also changed based on this change. In a similar manner, if a setting of the client apparatus is changed, a corresponding value of the master data on the server is also changed.

Further, it is possible to arrange both the client apparatus and the server apparatus in the same information processing apparatus. Japanese Patent Laid-Open No. 2008-46981 discloses how a plurality of system boards can be mounted in a single apparatus when a plurality of processing systems are to be arranged in a single information processing apparatus.

The technique disclosed in Japanese Patent Laid-Open No. 2008-46981 tries to reduce the frequency of access failures by having a CPU mounted on the system board transfer an access request to a firmware hub of another system board when the CPU cannot access the firmware hub of its own system board.

However, the following problem remains in this technique when both of the above-described server and client are arranged as a system board in the same information processing apparatus. When, for example, immediately after power-on, the client which generally has a lighter startup processing load than the server changes to standby and accesses the server in the same information processing apparatus for synchronization, access may be denied because synchronization request reception preparation processing is not complete in the server. Such circumstance often occurs if the initialization processing load of the server apparatus is heavy when the client apparatus and the server apparatus both execute startup, such as at the time of the startup of the information processing apparatus. Additionally, in such a case, many meaningless records of failure history will remain concerning the access to the server apparatus every time the information processing apparatus is activated.

The present invention has been made in consideration of the related art and has as its object to provide an information processing apparatus that can prevent an error arising from a server startup delay, a control method of an information processing apparatus, and a program.

SUMMARY OF INVENTION

To achieve the above object, embodiments according to the present invention have the following arrangement.

According to one aspect of the present invention, there is provided an information processing apparatus comprising: storage means for storing target data; control means for performing, in startup of the information processing apparatus, control to synchronize the target data with master data managed by a server; and management means for managing, after startup of a server function for implementing the server, the control means so as to start synchronizing the target data with the master data.

According to another aspect of the present invention, there is provided an information processing apparatus that synchronizes synchronization target data to master data held in a server at the time of startup, comprising: storage means for storing the synchronization target data; determination means for determining, before the synchronization of the synchronization target data to the master data at the time of startup, whether the information processing apparatus and the server are the same apparatus; synchronization means for synchronizing synchronization target data to the master data; and log means for recording a log, wherein if the determination means determines that the information processing apparatus and the server are the same apparatus, no log recording is performed by the log means for a predetermined period.

Further features of the present invention will become apparent from the following description of exemplary embodiments with reference to the attached drawings.

BRIEF DESCRIPTION OF DRAWINGS

FIG. 11A is a flowchart showing the processing procedure of a setting management server 110 and a multifunction peripheral 120;

FIG. 13A is a view showing an example of log information recorded in the multifunction peripheral 120;

FIG. 13B is a view showing an example of log information recorded in the multifunction peripheral 120;

DESCRIPTION OF EMBODIMENTS

Embodiments according to the present invention will be described below with reference to the drawings.

First Embodiment

System Arrangement

The information sharing system according to the embodiment causes, for every predetermined timing, setting information held in a server and setting information held in a client to be shared between the apparatuses. In this manner, changed setting information is shared with the other even if the setting information held in either the server or the client changes with the elapse of time. Processing for information sharing between the server and the client will be called synchronization processing in the following description.

Figure 1:
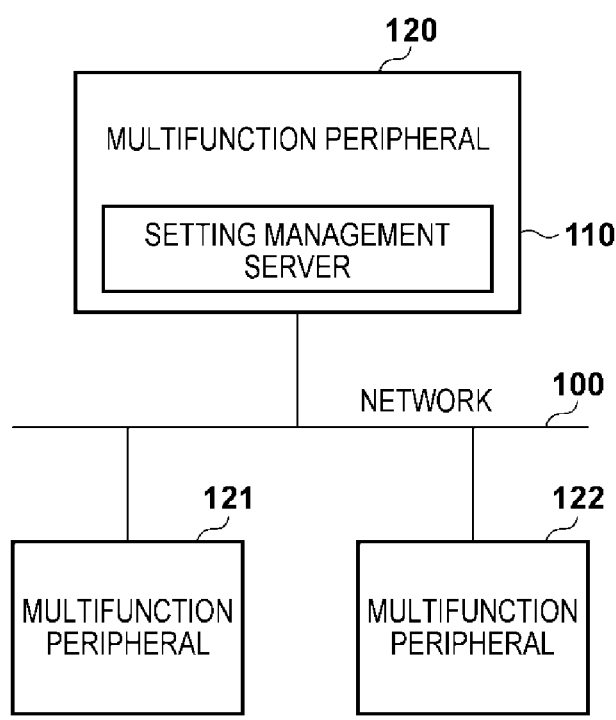
FIG. 1 is a view showing the entire system arrangement of a setting synchronization system.

FIG. 1 is a view showing the entire system arrangement of a setting synchronization system that performs synchronization control according to the present invention. Multifunction peripherals 120, 121, and 122 also referred to as image forming apparatuses or information processing apparatuses are connected to a network 100, and a setting management server 110 is arranged internally in the multifunction peripheral 120. The setting management server 110 manages master data of the settings for the multifunction peripherals 120, 121, and 122. The master data is data corresponding to data held by each multifunction peripheral as a client. When there is a change in the master data, the multifunction peripherals 120, 121, and 122 are notified of the change information via the network 100. Additionally, the setting management server 110 changes the values of the master data when it receives setting change information from the multifunction peripherals 120, 121, and 122.

The multifunction peripheral 120 is a device that implements several types of functions such as copy and FAX and internally stores settings used for executing these functions. The multifunction peripheral 120 is a client that receives a service from the setting management server 110 and notifies the setting management server 110 of change information via the network 100 when there is change in the settings. When the multifunction peripheral 120 receives change information of the master data of the settings from the setting management server 110, it changes the values of its own settings. Note that depending on the setting, a value may be synchronized between a plurality of multifunction peripherals such as between the multifunction peripherals 120, 121, and 122. Each multifunction peripheral of the multifunction peripherals 120, 121, and 122 is notified of the setting change information when there is change in the master data on the setting management server 110 concerning these settings. If there is a change in the settings in one of the multifunction peripherals 120, 121, and 122, the setting management server 110 is first notified of the change information and each multifunction peripheral is subsequently notified of the change information via the setting management server 110. In the initialization processing after power-on, the multifunction peripheral 120 synchronizes synchronization target data (the settings in this example) to the master data held by the setting management server 110. That is, the startup time becomes a synchronization point. A detailed description of the setting management server 110 and the multifunction peripheral 120 will be given later.

Figure 2:
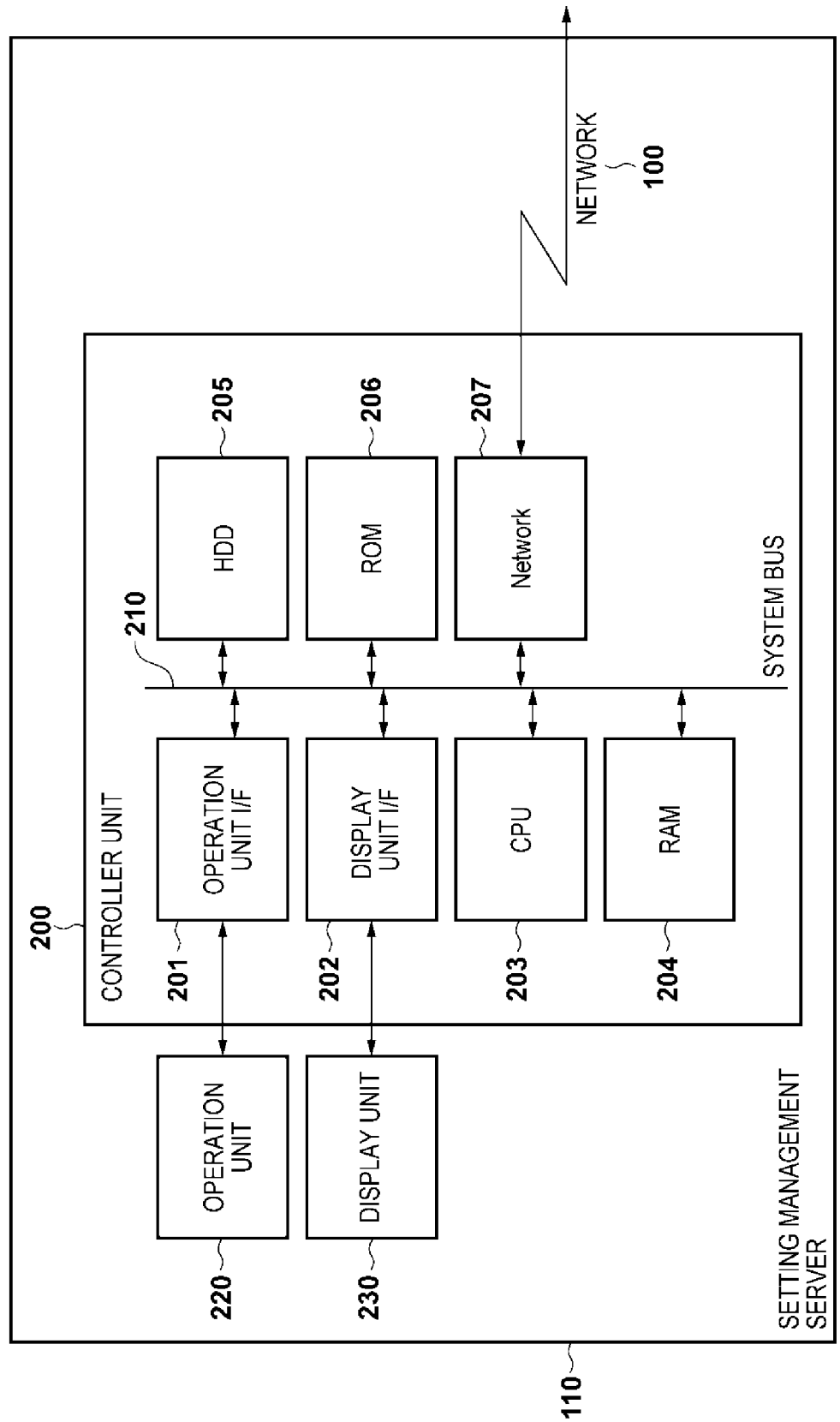
FIG. 2 is a block diagram showing the arrangement of a setting management server 110.

FIG. 2 is a block diagram showing the arrangement of the setting management server 110 according to this invention. The setting management server 110 includes a controller unit 200, an operation unit 220, and a display unit 230. The controller unit 200 includes a CPU (Central Processing Unit) 203. The CPU 203 activates an OS (Operating System) according to a boot program stored in a ROM (Read Only Memory) 206. On the OS, the CPU 203 executes an application program stored in an HDD (Hard Disk Drive) 205, thereby executing various kinds of processes. A RAM (Random Access Memory) 204 is used as the work area of the CPU 203. The HDD 205 stores the above-described application programs and the master data of the settings of the multifunction peripheral 120. A management method of the master data will be described in detail later. In addition to the ROM 206 and the RAM 204, an operation unit interface (I/F) 201, a display unit I/F 202, and a network I/F 207 are connected to the CPU 203 via a system bus 210. The operation unit I/F 201 is an interface for the operation unit 220 which is constituted from a mouse, a keyboard, and the like and transmits information input by the user using the operation unit 220 to the CPU 203. The display unit I/F 202 outputs, to the display unit 230, image data to be displayed on the display unit 230 which is constituted by a display or the like. The network I/F 207 is connected to the network 100 and performs input/output of information between the apparatuses on the network 100 via the network 100. The operation unit 220 and the display unit 230 can be integrally formed as a touch panel or the like.

Figure 3:
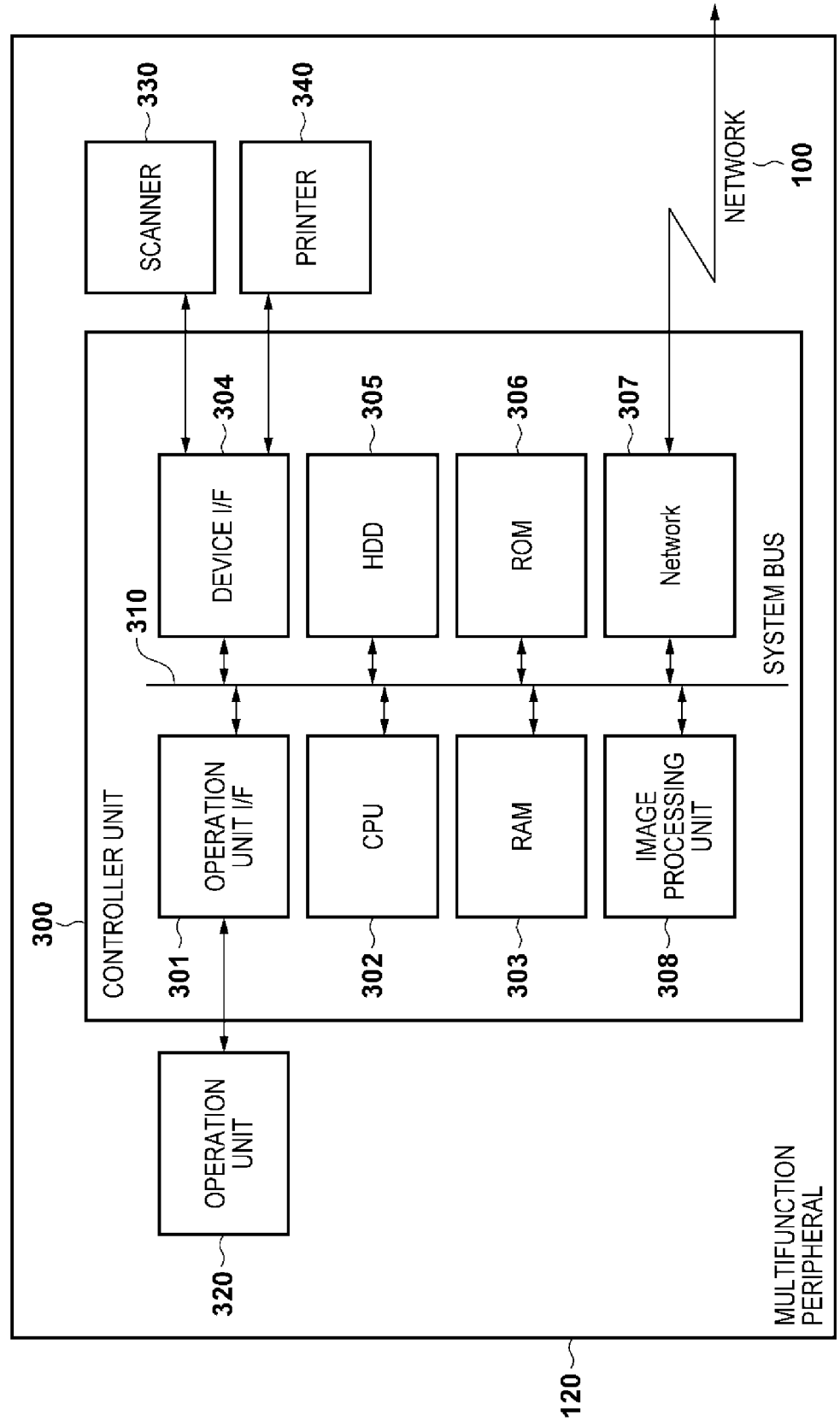
FIG. 3 is a block diagram showing the arrangement of a multifunction peripheral 120.

FIG. 3 is a block diagram showing the arrangement of the multifunction peripheral 120 according to the present invention. The multifunction peripheral 120 includes a controller unit 300, an operation unit 320, a scanner 330, and a printer 340. The controller unit 300 is connected to the operation unit 320 and is also connected to the scanner 330 serving as an image input device and the printer 340 serving as an image output device.

The controller unit 300 includes a CPU 302. The CPU 302 activates an OS according to a boot program stored in a ROM 306. On the OS, the CPU 302 executes an application program stored in an HDD 305, thereby executing various kinds of processes. A RAM 303 is used as the work area of the CPU 302. The RAM 303 provides, in addition to the work area, an image memory area for temporarily storing image data. The HDD 305 stores the above-described application programs, image data, and various kinds of settings. A setting management method in the multifunctional peripheral 120 will be described later.

In addition to the ROM 306 and the RAM 303, an operation unit I/F 301, a device I/F 304, a network I/F 307, and an image processing unit 308 are connected to the CPU 302 via a system bus 310. The operation unit I/F 301 is an interface for the operation unit 320 which includes a touch panel and outputs, to the operation unit 320, image data to be displayed on the operation unit 320. The operation unit I/F 301 transmits information input by the user using the operation unit 320 to the CPU 302. The device I/F 304 is connected to the scanner 330 and the printer 340. The device I/F 304 performs synchronous/asynchronous conversion of image data. The network I/F 307 is connected to the network 100 and performs input/output of information between the apparatuses on the network 100 via the network 100. The image processing unit 308 performs processes such as image input processing from the scanner 330 and output image processing to the printer 340, image rotation, image compression, resolution conversion, color space conversion, and tone conversion.

Note that in the system arrangement according to the present invention described with reference to FIG. 1, the setting management server 110 and the multifunction peripheral 120 are the same device and share the hardware arrangement described above with reference to FIGS. 2 and 3. That is, the setting management server 110 operates by using the hardware of the same name configured in the multifunction peripheral 120 in such a way that, for example, the same CPU is used as the CPU 203 of the setting management server 110 and the CPU 302 of the multifunction peripheral 120. In other words, out of the components of the multifunction peripheral 120 shown in FIG. 3, the image processing unit 308, the scanner 330, and the printer 340 are used only by the multifunction peripheral 120 but other components are the same as the corresponding components shown in FIG. 2. Note that when the server and the client are executed in a common hardware, such as in this embodiment, the server and the client may be discriminated from the apparatus as hardware by being called a server module and a client module or a server function and a client function.

Configuration of Master Data

Figure 4:
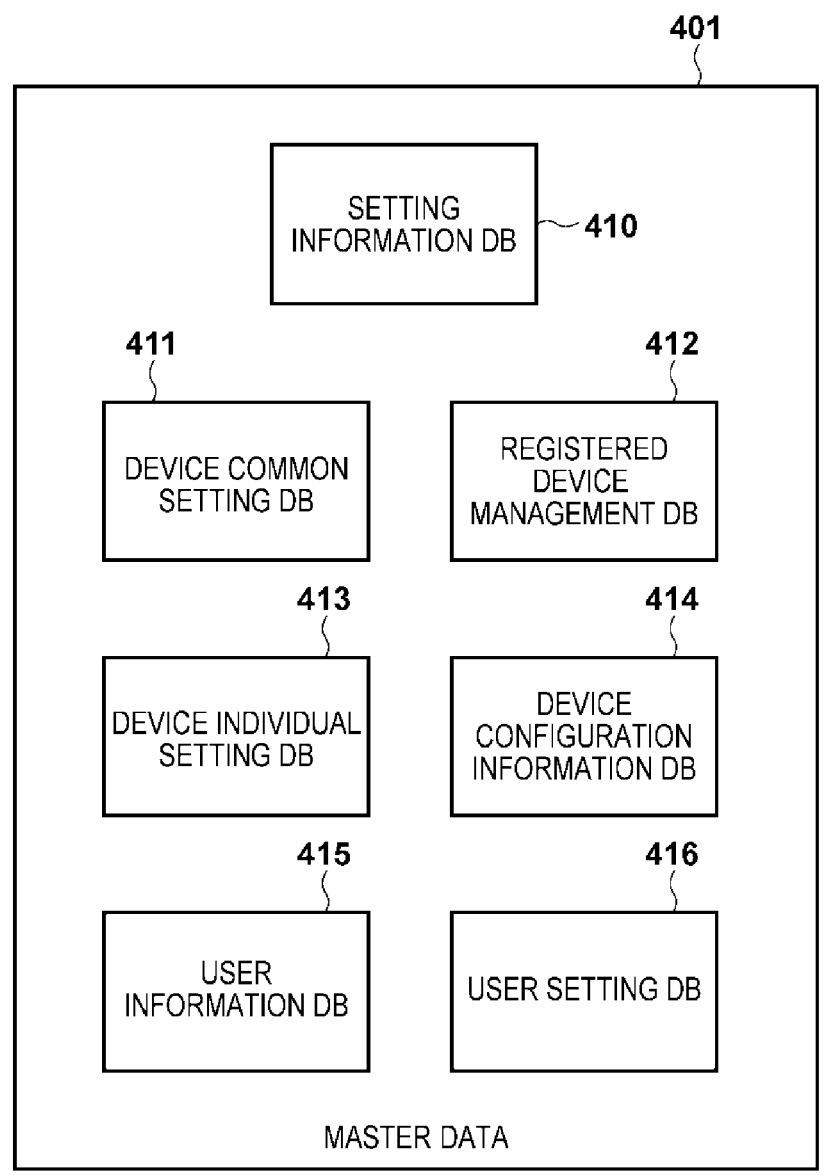
FIG. 4 is a block diagram showing the configuration of master data managed in the setting management server 110.

FIG. 4 is a block diagram showing the configuration of master data managed by the setting management server 110 according to the present invention. Master data 401 includes a setting information database (DB) 410, a device common setting DB 411, a registered device management DB 412, a device individual setting DB 413, a device configuration information management DB 414, a user information DB 415, and a user setting DB 416.

Table 1 shows an example of data stored in the setting information database 410. The setting information DB 410 is a database that stores metadata regarding each setting managed in the setting management server 110. The setting information DB 410 stores, for each setting item, a key identifier for identifying a setting when communicating with the multifunction peripheral 120, a phrase to present a setting to a user, an initial value of a setting, a range, a compatible model/version of a setting, and a setting display condition. Each setting managed in the setting information DB 410 depends on the device model or the firmware version of the multifunction peripheral 120, and information about whether a setting exists or information such as the range or initial value of the setting may vary. Table 1 shows that a setting identified by a key identifier "settings.pattern" exists for all individuals of model A and model B, but exists for only individuals of firmware version 3.01 or later for model C. Also in this setting, as a display condition for displaying, addition of a copy-forgery-inhibited pattern license is set as a condition. A setting identified by a key identifier "settings.density" exists depending on the version of the installed firmware for model B. Note that different range and initial value of the setting can be set depending on the device model or the firmware version or depending on both the device model and the firmware version. Settings subsequent to "settings.density" shown in Table 1 indicate that they are the same range and initial value regardless of the device model or firmware version.

Table 2 is a table showing data stored in the device common setting DB 411. The device common setting DB 411 is a database that manages a setting which is a value shared and synchronized among all of the plurality of multifunction peripherals that have their settings managed by the management server 110. The device common setting DB 411 stores a key identifier, a setting corresponding to the identifier, the last update date/time of a setting, and the aforementioned synchronization target information. The key identifier is an identifier of the same system as that of the key identifier in the setting information DB 410.

Table 3 is a table showing data stored in the device individual setting DB 413. The device individual setting DB 413 is a database that manages a setting whose value differs between each of the plurality of multifunction peripherals that has its settings managed by the management server 110. A plurality of device individual setting DBs 413 exist in correspondence with the respective individuals of the multifunctional peripherals. The device individual setting DB 413 stores a key identifier, a value corresponding to the identifier, and the last update date/time of a setting. The key identifier is an identifier of the same system as that of the key identifier in the setting information DB 410.

Table 4 is a table showing device configuration information contents for each individual multifunction peripheral managed by the device configuration information management DB 414. The device configuration information management DB 414 is a database that stores and manages a plurality of pieces of device configuration information. This device configuration information includes an individual identifier for identifying each individual multifunction peripheral, a model name, a firmware version, installed license information representing an available function, and accessory information indicating an optional configuration such as a finisher or the like. Note that the model name, firmware version, and license are pieces of information of the same system as those stored in the setting information DB 410.

The registered device management DB 412 is a database for managing an individual identifier of each management target individual multifunction peripheral whose settings are managed by the setting management server 110. The registered device management DB 412 includes, therefore, the individual identifier of a management target apparatus. In addition, an address for communication such as an IP address or a MAC address of an individual can be held in association with the individual identifier.

Table 5 is a table showing data stored in the user information DB 415. The user information DB 415 is a database for managing information regarding each user who uses each multifunction peripheral. The user information DB 415 stores a user ID for uniquely identifying a user, a user name to be input by a user to log in, a name to be used for display or the like.

Table 6 is a table showing data stored in the user setting DB 416. The user setting DB 416 is a database for managing settings, for each user, that can be used by each user who uses each multifunction peripheral. The user setting DB 416 stores an user ID for uniquely identifying a user, a key identifier for uniquely identifying a setting, contents of a setting, and the last update date/time of a setting. Note that this user ID is of the same system as that in the user information DB 415.

The setting management server 110 can use each database of the master data 401 described above and collectively manage a setting differing for each management target multifunction peripheral, a setting common for all the management target multifunction peripherals, and the metadata for each setting itself.

Table 7 is a table showing an example of the configuration of cache data 511 stored in the HDD 305 of the multifunction peripheral 120 according to the present invention. The cache data 511 is a database that stores settings used in the multifunction peripheral 120. Settings stored in the cache data 511 are formed from elements such as a key identifier for identifying a setting, a value of a setting, a UI display phrase, an initial value, a range, a display condition, and the last update date/time. Note that the last update date/time of the cache data need not be included. These elements are managed under the same system as those managed in the master data 401. When a setting is changed in either the setting management server 110 or the multifunction peripheral 120, the setting is synchronized by communicating at least the key identifier and the value out of the data shown in Table 7. The synchronization processing of the above-described settings is performed by causing the network I/F 207 of the setting management server 110 and the network I/F 307 of the multifunction peripheral 120 to communicate via the network 100.

TABLE 1

| Key Identifier | UI Display Phrase | Initial Value | Range | Compatible Model/Firmware Version | Display Condition |
|---|---|---|---|---|---|
| settings.pattern | Copy-Forgery-Inhibited Pattern Printing | 0 | 0-1 | Mode A/ALL Model B/ALL Model C/V3.01 or later | Copy-Forgery-Inhibited Pattern License |
| settings.density | Printing Density | 5 | 0-10 | Model A/ALL Model B/2.01 or Later | — |
| settings.density | Printing Density | 3 | 0-6 | Model B/1.01 or later Model C/ALL | — |
| settings.my_ip_address | IP Address of Self Device | "" | Character String | ALL | — |
| settings.server_ip_address | IP Address of Synchronization Destination Server | "" | Character String | ALL | — |
| ... | | | | | |

TABLE 2

| Key Identifier | Value | Last Update Date/Time |
|---|---|---|
| settings.density | 0 | 2013/9/9/12:01 |
| settings.sleep_time | 3600 | 2013/9/8/17:35 |
| ... | | |

TABLE 3

| Key Identifier | Value | Last Update Date/Time |
|---|---|---|
| settings.pattern | 1 | 2013/5/9/18:42 |
| settings.my_ip_address | "123.456.789.012" | 2013/6/18/17:43 |
| settings.server_ip_address | "123.456.789.012" | 2013/7/7/12:55 |
| ... | | |

TABLE 4

| Attribute | Value |
|---|---|
| Individual Identifier | Individual 1 |
| Model Name | Model A |
| Firmware Version | 0.01 |
| Installed License | Copy-Forgery-Inhibited Pattern License |
| Accessory | Finisher-X |

TABLE 5

| User ID | User name | First name | Last name |
|---|---|---|---|
| 501 | sato | Takashi | Sato |
| 502 | ii | Ryoko | Ii |
| ... | | | |

TABLE 6

| User ID | Key Identifier | Value | Last Update Date/Time |
|---|---|---|---|
| 501 | preference.print_setting1 | {colormode: "BW", copies: "3"} | 2013/2/4/2:01 |
| 501 | preference.print_setting2 | {colormode: "CL", quality: "low"} | 2013/2/3/7:35 |
| 501 | preference.address1 | {destination: "sato@canon.com"} | 2013/8/30/3:01 |
| 501 | preferene.address2 | {destination: user1@canon.com"} | 2013/1/13/2:16 |
| ... | | | |

TABLE 7

| Key Identifier | Setting | UI Display Phrase | Initial Value | Range | Display Condition | Last Update Date/Time |
|---|---|---|---|---|---|---|
| settings.pattern | 1 | Copy-Forgery-Inhibited Pattern Printing | 0 | 0-1 | Copy-Forgery-Inhibited Pattern License | 2013/5/9/18:42 |
| settings.density | 0 | Printing Density | 5 | 0-10 | — | 2013/9/9/12:01 |
| settings.my_ip_address | "123.456.789.012" | IP Address of Self Device | " " | Character String | — | 2013/6/18/17:43 |
| settings.server_ip_address | "123.456.789.012" | IP Address of | " " | Character | — | 2013/7/7/ |

TABLE 7-continued

| Key Identifier | Setting | UI Display Phrase | Initial Value | Display Range | Display Condition | Last Update Date/Time |
|---|---|---|---|---|---|---|
| | | Synchronization Destination Server | | String | | 12:55 |
| ... | | | | | | |

Setting Data Management Application Software

Figure 5:
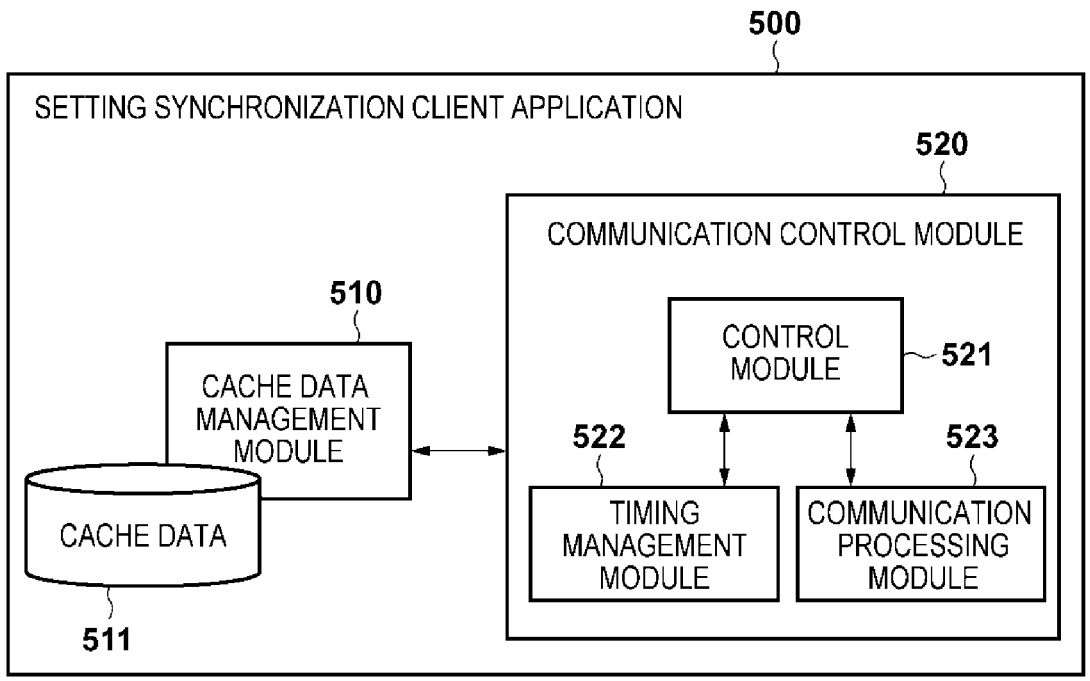
FIG. 5 is a block diagram showing the software configuration of the multifunction peripheral 120 in the setting synchronization system.

FIG. 5 is a block diagram showing setting data management application software that operates in the multifunction peripherals 120, 121, and 122 in the synchronization system according to the present invention. A setting synchronization client application 500 includes a cache data management module 510 and a communication control module 520. The cache data management module 510 manages the cache data 511 of the multifunction peripheral 120. "Managing" is, in other words, performing maintenance such as saving, updating and the like. The communication control module 520 is formed from a plurality of blocks and controls the communication performed through the network I/F 307. In this specification, the setting synchronization client application 500 is stored in any one of the storage means such as the RAM 303, the HDD 305, and the ROM 306 and is executed by the CPU 302.

The cache data 511 managed by the cache data management module 510 is saved in the HDD 305, the RAM 303, the ROM 306, or the like. Note that if cache data is to be saved in a volatile memory such as a RAM or the like, the memory needs to be backed up. Additionally, as a ROM saving cache data, a programmable ROM capable of being rewritten in a mounted state is preferred. The communication control module 520 includes a control module 521 that controls setting synchronization processing with the setting management server 110, a timing management module 522 that manages the synchronization timing of setting data, and a communication processing module 523 that performs communication processing via the network I/F 307. Processing performed in each processing module will be described in detail below.

When the communication control module 520 (to be described later) acquires setting update information from the setting management server 110, the cache data management module 510 receives this update information from the communication control module 520 and performs processing to synchronize the update information with the cache data 511 that is managed by itself. When the information of the cache data 511 is updated in the multifunction peripheral 120 by, for example, an update operation by a user, the cache data management module 510 requests the communication control module 520 to synchronize the update information with the master data 401 which is managed by the setting management server 110.

The communication control module 520 controls setting synchronization communication with the setting management server 110. Note that in this embodiment, "synchronization communication" points to communication for synchronizing a setting between the master data 401 and the cache data 511. The timing management module 522 determines an acquisition timing for regularly acquiring the update information of the master data 401 from the setting management server 110. The timing management module 522 also receives a request from the control module 521 (to be described later) and determines whether it is a timing in which the initial communication after startup with the setting management server 110 can be executed. The control module 521 receives the update information of the master data 401 acquired by the communication processing module 523 from the setting management server 110 and requests the cache data management module 510 to synchronize the update information. Note that connection information or the like to a communication destination server uses information set as cache data. The specific method will be indicated in the explanation of the processing procedure.

Setting Management Application Software

Figure 6:
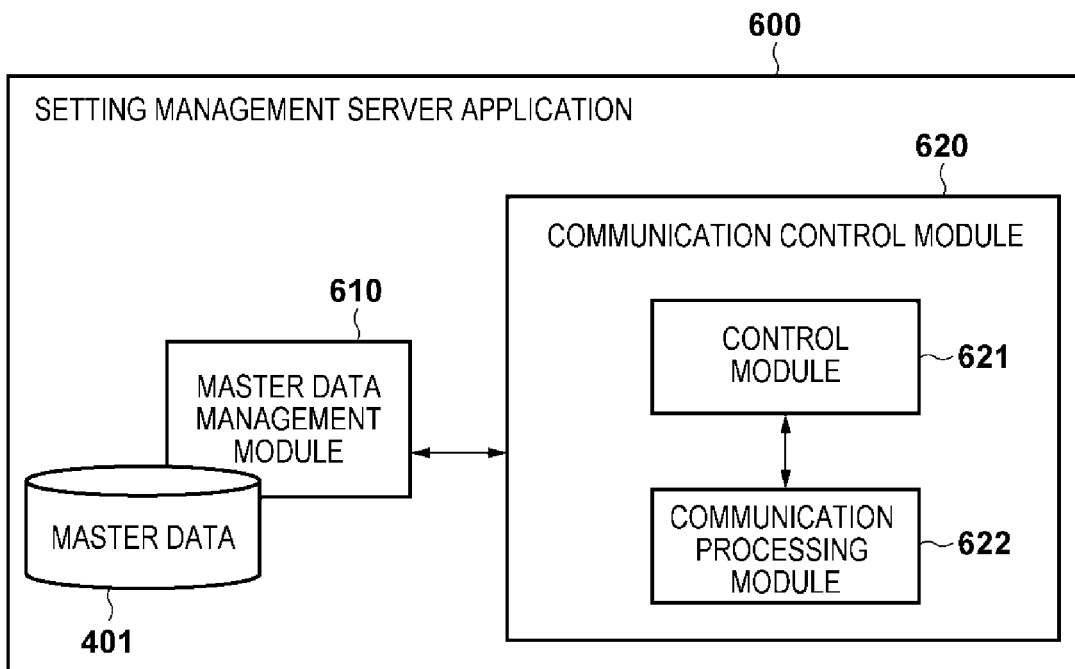
FIG. 6 is a block diagram showing the software configuration of the setting management server 110.

FIG. 6 is a block diagram showing setting management application software that operates in the setting management server 110 in the synchronization system according to the present invention. In this specification, a setting management server application 600 is stored in any one of the storage means such as the RAM 204, the HDD 205, and the ROM 206 and is executed by the CPU 202. The setting management server application 600 includes a master data management module 610 and a communication control module 620. The master data management module 610 manages the aforementioned master data 401 out of the setting data on the setting management server 110. The communication control module 620 is formed by a plurality of blocks and controls communication via the network I/F 207. The master data 401 managed by the master data management module 610 is saved in the HDD 205, the RAM 203, the ROM 206 or the like. The communication control module 620 is formed by a control module 621 that controls setting synchronization processing with the multifunction peripherals 120, 121, and 122 and a communication processing module 622 that performs communication processing via the network I/F 207. Processing performed in each processing module will be described in detail below.

When the communication control module 620 receives setting update information from any of the multifunction peripherals 120, 121, and 122, the master data management module 610 performs processing to synchronize the received setting update information with the master data 401 managed by the setting management server 110. When the communication control module 620 receives a setting difference information acquisition request from any of the multifunction peripherals 120, 121, and 122, the master data management module 610 creates the setting difference information to be transmitted to the corresponding multifunction peripheral and performs processing to notify the communication control module 620.

The communication control module 620 controls setting synchronization communication with the multifunction peripherals 120, 121, and 122. When the communication processing module 622 receives setting update information from any of the multifunction peripherals 120, 121, and 122, the control module 621 notifies the master data management module 610 of the corresponding setting update information. Additionally, when the communication processing module 622 receives a setting difference information acquisition request from any of the multifunction peripherals 120, 121, and 122, the control module 621 acquires the setting difference information of the corresponding multifunction peripheral from the master data management module 610 and performs processing to instruct the communication processing module 622 to transmit the acquired setting difference information to the multifunction peripheral. The communication processing module 622 executes communication processing with the corresponding one of the aforementioned multifunction peripherals 120, 121, and 122.

Setting Synchronization Processing Procedure

Figure 7:
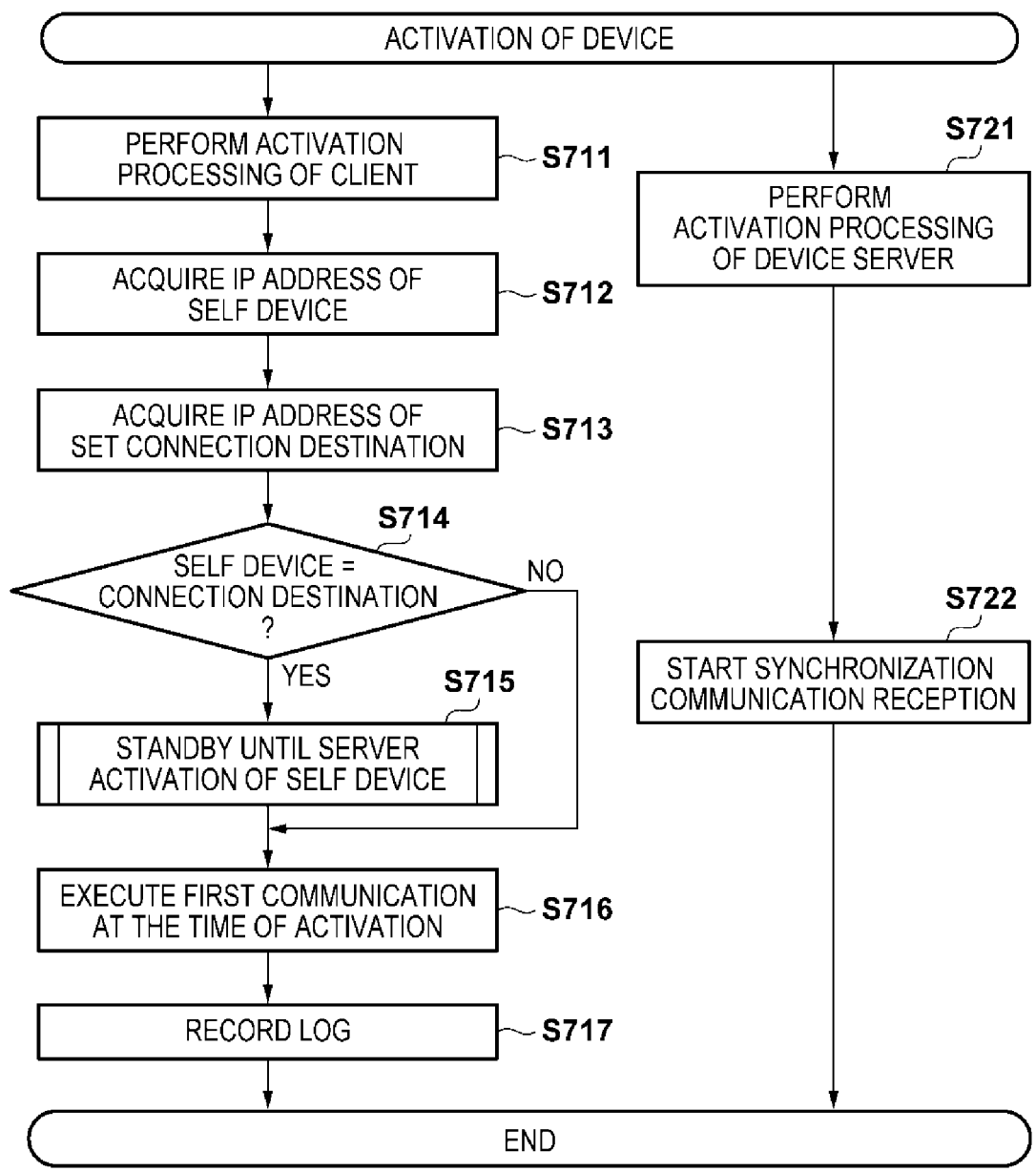
FIG. 7 is a flowchart showing the processing procedure of the setting management server 110 and the multifunction peripheral 120.

FIG. 7 is a flowchart on the setting synchronization processing of the multifunction peripheral 120 according to the present invention for explaining the processing procedure of the setting synchronization client application 500 and the setting management server application 600 upon startup of the multifunction peripheral 120. The execution procedure of this flowchart is executed by the CPU 302 of the multifunction peripheral 120. The execution procedure of this flowchart starts when the startup of the multifunction peripheral 120 starts from, for example, pressing a power button (not shown) or the like on the operation unit 220 of the multifunction peripheral 120. When the multifunction peripheral 120 is activated, a setting management server module and a client module installed in the multifunction peripheral 120 start the startup processing. This causes the setting synchronization client application 500 and the setting management server application 600 to activate, and the procedure of FIG. 7 begins.

First, in step S711 the control module 521 of the setting synchronization client application 500 executes startup of the setting synchronization client application 500. In parallel with this execution, in step S721, the control module 621 of the setting management server application 600 executes startup of the setting management server application 600. Assume that the startup of the setting synchronization client application 500 in step S711 is completed before the startup of the setting management server application 600 in step S721 is completed. At this time, the control module 521 determines whether it is possible to execute synchronization communication from the setting synchronization client application 500 to the setting management server application 600 by executing the procedures of subsequent steps S712, S713 and step S714.

The control module 521 acquires, first in step S712, the IP address of the multifunction peripheral 120. This IP address is a value in "settings.my_ip_address" included in the cache data 511 of the multifunction peripheral 120 shown in Table 7. In the next step S713, the control module 521 acquires the IP address of the synchronization communication destination server, that is, the device in which the setting management server application 600 is arranged. This IP address is a value in "settings.server_ip_address" included in the cache data 511 shown in Table 7. Note that acquisition of both of these IP addresses is executed when an acquisition request of the multifunction peripheral 120 is transmitted to the cache data management module 510, and the cache data management module 510 loads the IP addresses from the cache data 511 and transmits them to the control module 521 in response to this request.

In the subsequent step S714, the control module 521 compares the IP address of its own device acquired in steps S712 and S713 with the IP address of the synchronization destination server. By determining whether both addresses match each other, the control module 521 determines whether the setting management server application 600 is arranged in the multifunction peripheral 120. If both addresses match, they are the same device so the process advances to step S715. If the addresses do not match, they are given by different devices, so the process advances to step S716. If the state of the cache data of the multifunction peripheral 120 is in the state described with reference to Table 7, the values of both IP addresses are "123.456.789.012" and thus are equal. In this case, therefore, the control module 521 determines that both IP addresses match (YES in step S714), and the process advances to step S715.

Figure 8:
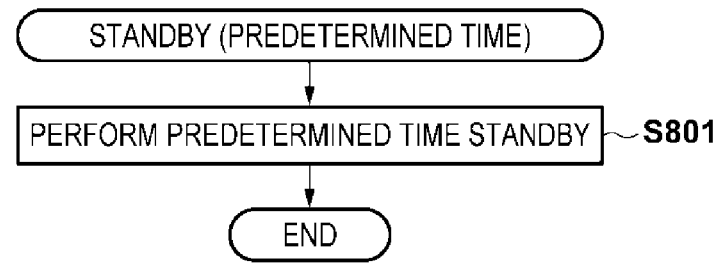
FIG. 8 is a flowchart showing the processing procedure of the multifunction peripheral 120.

In step S715, the control module 521 instructs the timing management module 522 to standby until the startup, in step S721, of the setting management server application 600 arranged in the multifunction peripheral 120 is completed. FIG. 8 is a flowchart showing the processing procedure, in step S715, of the timing control module 522 that receives this instruction. In step S801, the timing management module 522 stands by for a predetermined period set in advance (that is stands by for a predetermined time). After standing by for a predetermined time, that is, when standby is completed, the control module 521 is notified of the completion and the sequence shown in FIG. 8 ends. Note that the predetermined time that the timing module 522 stands by is given by an appropriate time which is calculated from the processing time taken by the startup of the setting management server 600 in step S721. The predetermined time may be hard-coded by a program of the timing management 52, and stored in a non-volatile manner in any one of the storage means such as the RAM 204, the HDD 205, and the ROM 206. The predetermined standby time may also be stored as a setting of the multifunction peripheral 120 in the cache data 511. A time required for activating the setting management server application 600 can be, for example, measured in advance. Assume that the startup of the setting management server application 600 in step S721 is completed during the execution of step S801.

The process returns to the sequence of FIG. 7. First, the control module 621 of the setting management server application 600 instructs, in response to the completion of the startup in step S721, the communication processing module 622 to start reception of communication with the setting synchronization client application 500. In the subsequent step S722, the communication processing module 622 starts communication reception upon receiving this instruction. On the other hand, upon receiving a standby completion notification from the timing management module 522, the control module 521 first instructs the communication processing module 523 to execute first synchronization communication at the time of startup with the setting management server application 600 in step S716. Next, upon receiving this instruction, the communication processing module 523 executes the first synchronization communication at the time of startup toward the setting management server application 600. At this time, the communication processing module 523 notifies the control module 521 of the execution result of the first communication at the time of startup. In the subsequent step S717, upon receiving the synchronization communication processing execution result, the control module 521 stores the execution result as log information in any one of the storage means such as the RAM 204, the HDD 205, and the ROM 206. FIG. 13A is a view showing an example of the log information stored in step S717. The log information of this embodiment includes a level indicating success/failure of communication, communication date/time, processing contents, a connection destination URL, a target, access type (method) to the target data, and the like. Note that the level will indicate "Normal" when synchronization communication processing is successful, "Warning" when the processing fails by a temporary factor, or "Error" when the processing fails from a permanent factor. If the setting synchronization client application 500 implements the synchronization processing of step S716 at a timing before the execution of step S722 is completed in the setting management server application 600 of the multifunction peripheral 120, the log information will be recorded as "Warning level" which indicates a state of temporary communication failure as, for example, shown in FIG. 13B. The log information shown in this embodiment is merely an example and may take another mode than this. Note that synchronization communication at the time of client startup in step S716 is processing for updating the cache data 501 by obtaining the settings of the client multifunction peripheral from the master data 401 of the server. In this manner, settings synchronized to the master data 401 can be used after power-on when using the multifunction peripheral.

Accordingly, the processing of synchronizing the target data with the master data can be managed so that the processing will start after startup of the server function for implementing the server.

By implementing the present invention as in the above-described example, even when a setting management server is arranged in a multifunction peripheral, the frequency of failure caused by executing synchronization communication while the startup of the server is incomplete at the time of startup of the multifunction peripheral can be reduced.

Note that while the setting management server 110 may be implemented by, as in this embodiment, a software module that shares communication resources and computation resources such as the multifunction peripheral 120 and its hardware, especially the CPU 302 and the RAM 303, and the network I/F 307, it may also be implemented by dedicated hardware provided in the multifunction peripheral 120 as described in Japanese Patent Laid-Open No. 2008-046981. Even in such a case, the power source or the power switch is shared.

Operation of Multifunction Peripheral that has No Setting Management Server

In the system arrangement described above with reference to FIG. 1, the processing of the multifunction peripheral 120 in which both the setting synchronization client application 500 and the setting management server application 600 are arranged according to the present invention has been described. Next, in the same system arrangement, an example of implementing the present invention to the multifunction peripheral 121 in which the setting synchronization client application 500 is arranged while no setting management server application 600 is arranged will be explained. It will show that, in a case where no setting management server is arranged in the multifunction peripheral itself, the multifunction peripheral itself can start communication with the setting management server immediately after the startup of the setting synchronization client application of the multifunction peripheral itself.

Note that since the system arrangement, the hardware arrangement, the software configuration, the data structure, and the processing procedure of the embodiment are the same as those described in the first embodiment, a description thereof will be omitted and only different sections will be explained.

Assume that the processing procedure described in FIG. 7 has been implemented in the multifunction peripheral 120, and the setting management server 110 arranged in the multifunction peripheral 120 is operating in a communicable state. Also, assume that the IP address of the multifunction peripheral 121 and the IP address of the connection destination server set in the cache data 511 of the multifunction peripheral 121 are respectively set as the values shown in Table 8.

TABLE 8

| Key Identifier | Value | Last Update Date/Time |
|---|---|---|
| settings.my_ip_address | "123.456.789.013" | 2013/6/18/18:30 |
| settings.server_ip_adress | "123.456.789.012" | 2013/7/7/13:13 |

The present invention is implemented by pressing the power button of the multifunction peripheral 121 in such a state and starting the startup by the processing procedure shown in FIG. 7. At this time, the values of the IP addresses that the control module 521 acquires in steps S712 and S713 are "123.456.789.013" and "123.456.789.012", respectively. Thus, in the subsequent step S714, the control module 521 determines that no setting management server 110 is arranged in the multifunction peripheral 121 (NO in step S715), and the sequence of FIG. 7 ends after undergoing the subsequent processes in steps S716 and S717.

By implementing the present invention by such a procedure, in a case where no setting management server is arranged in the multifunction peripheral itself, communication with the setting management server can be started immediately after the startup of the setting synchronization client application of the multifunction peripheral itself.

In this manner, in a multifunction peripheral which only has the client and is arranged with no setting management server 110, synchronization of the master data 401 and the cache data 511 is tried without standing by for the startup of the management server at the time of the startup of the multifunction peripheral.

The aforementioned problem can be solved according to the present invention. For example, when the system has an arrangement in which startup occurs at the same time such as in a case where the server and the client are mounted in the same apparatus, an error due to server delay can be prevented.

Second Embodiment

In the processing procedure described in the first embodiment, when it is determined that the setting management server 110 is arranged in the multifunction peripheral itself, the processing was made to standby for a predetermined time in order to delay the communication timing of first synchronization at the time of startup from the setting synchronization client application 500 to the setting management server application 600. This embodiment will show, with reference to the drawings, that the present invention can be used also by causing, by a different method from the first embodiment, the first communication at the time of transition to standby (i.e., to delay) until the timing to receive the synchronization communication upon completion of the startup of a setting management server 110. Note that a description will be omitted for the system arrangement, the hardware arrangement, the software configuration, the data structure, and the processing procedure of the embodiment having the same sections as those described in the first embodiment, and only different sections will be explained.

Figure 9:
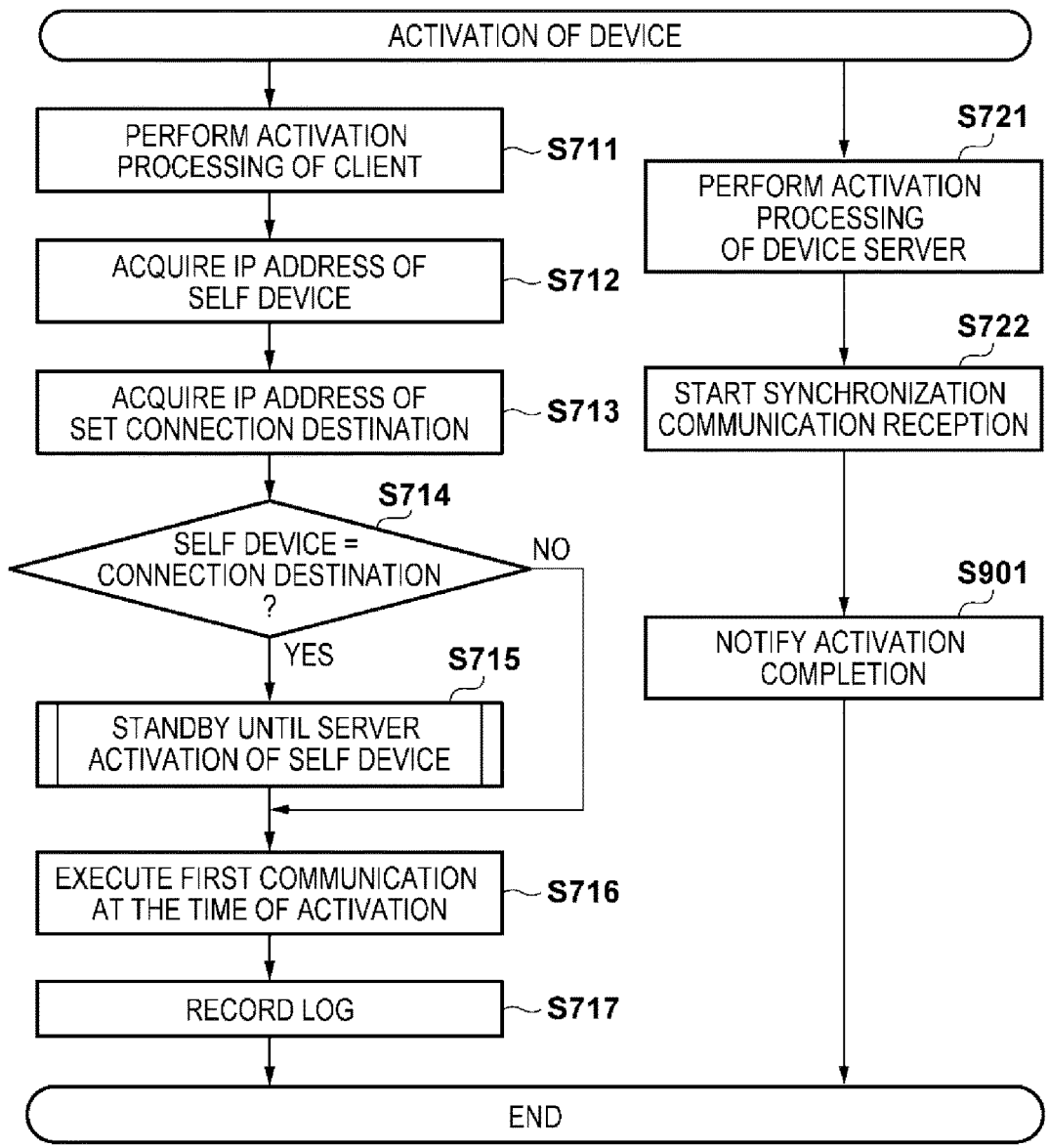
FIG. 9 is a flowchart showing the processing procedure of a setting management server 110 and a multifunction peripheral 120.
Figure 10:
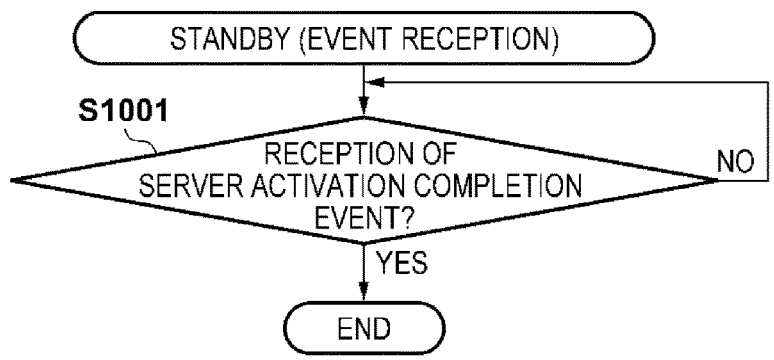
FIG. 10 is a flowchart showing the processing procedure of the multifunction peripheral 120.

FIG. 9 is a flowchart for explaining the processing procedure of setting synchronization communication at the time of startup of a multifunction peripheral 120 according to the embodiment. Assume here that as in the procedure described in the first embodiment, step S721 is being executed by a control module 621 of a setting management server application 600. Also, assume that in parallel to this, a setting synchronization client application 500 is in a state where steps S711, S712, S713, and S714 are executed in this order. In the subsequent step S715, a control module 521 instructs a timing management module 522 to stand by until step S721 is completed. Upon receiving this instruction, the timing management module 522 executes standby processing in accordance with the processing procedure shown in FIG. 10. That is, in step S1001, the startup completion notification of the setting management server application 600 is monitored. If it is determined, from the result of monitoring, that there is no startup completion notification (NO in step S1001), the monitoring of step S1001 is continued until the notification arrives. Otherwise, the standby ends and the process returns to step S716.

Assume that the control module 621 completes step S721 and a communication processing module 622 starts communication reception in the subsequent step S722. In the subsequent step S901, the control module 621 notifies the setting synchronization client application 500 of the startup completion of the setting management server application 600. At this time, the notification method may be, for example, a method that arranges information indicating the completion of startup on a RAM 303 of the multifunction peripheral 120 or a method that notifies by executing communication directly with the setting synchronization client application 500. The method is not limited. Upon reception of this notification, the timing management module 522 of the setting synchronization client application 500 determines that there was a startup completion notification of the setting management server application 600 in step S1001 (YES in step S1001), ends the sequence of FIG. 10, and ends the sequence of FIG. 9 after undergoing the subsequent steps S716 and S717.

By implementing the present invention by such a procedure, the standby time of the first communication at the time of startup by the setting synchronization client application can be suppressed to a minimum while implementing the effect of the first embodiment.

Third Embodiment

The previously described embodiments determined whether a setting management server is arranged in a multifunction peripheral in response to a result of a comparison between the preset IP address of the multifunction peripheral and the preset connection destination IP address to the device in which the setting management server is arranged. Additionally, in accordance with that determination result, the timing at which the setting synchronization client application initially connects at the time of startup to the setting management server application at the time of startup of the multifunction peripheral was controlled. This embodiment will describe, with reference to the drawings, how a more convenient setting synchronization system can be implemented by switching the operation performed by the setting synchronization client application at the time of startup of the multifunction peripheral in accordance with whether the connection destination IP address of the setting management server is set in advance. More specifically, the embodiment will show that in a situation where the connection destination is not determined and it is necessary for the startup of a setting management server 110 to be completed for the confirmation, it becomes possible to implement an operation of immediately implementing the standby processing without implementing the procedure described in the first embodiment. Note that descriptions for the system arrangement, the hardware arrangement, the software configuration, the data structure, and the processing procedure of the embodiment will be omitted for sections that are the same as those described in the previously described embodiments and only sections that are different will be described.

Assume here that the IP address of a multifunction peripheral 120 and the connection destination server IP address set in cache data 511 of the multifunction peripheral are set as the values shown in Table 8. That is, although "123.456.789.012" is set as the IP address of the multifunction peripheral 120 in the same manner as in the first embodiment, no IP address of the connection destination server is set and it is in a state where the connection destination server is not determined.

TABLE 9

| Key Identifier | Value | Last Update Date/Time |
|---|---|---|
| settings.my_ip_address | "123.456.789.012" | 2013/6/18/18:30 |
| settings.server_ip_address | "" | — |

Figure 11B:
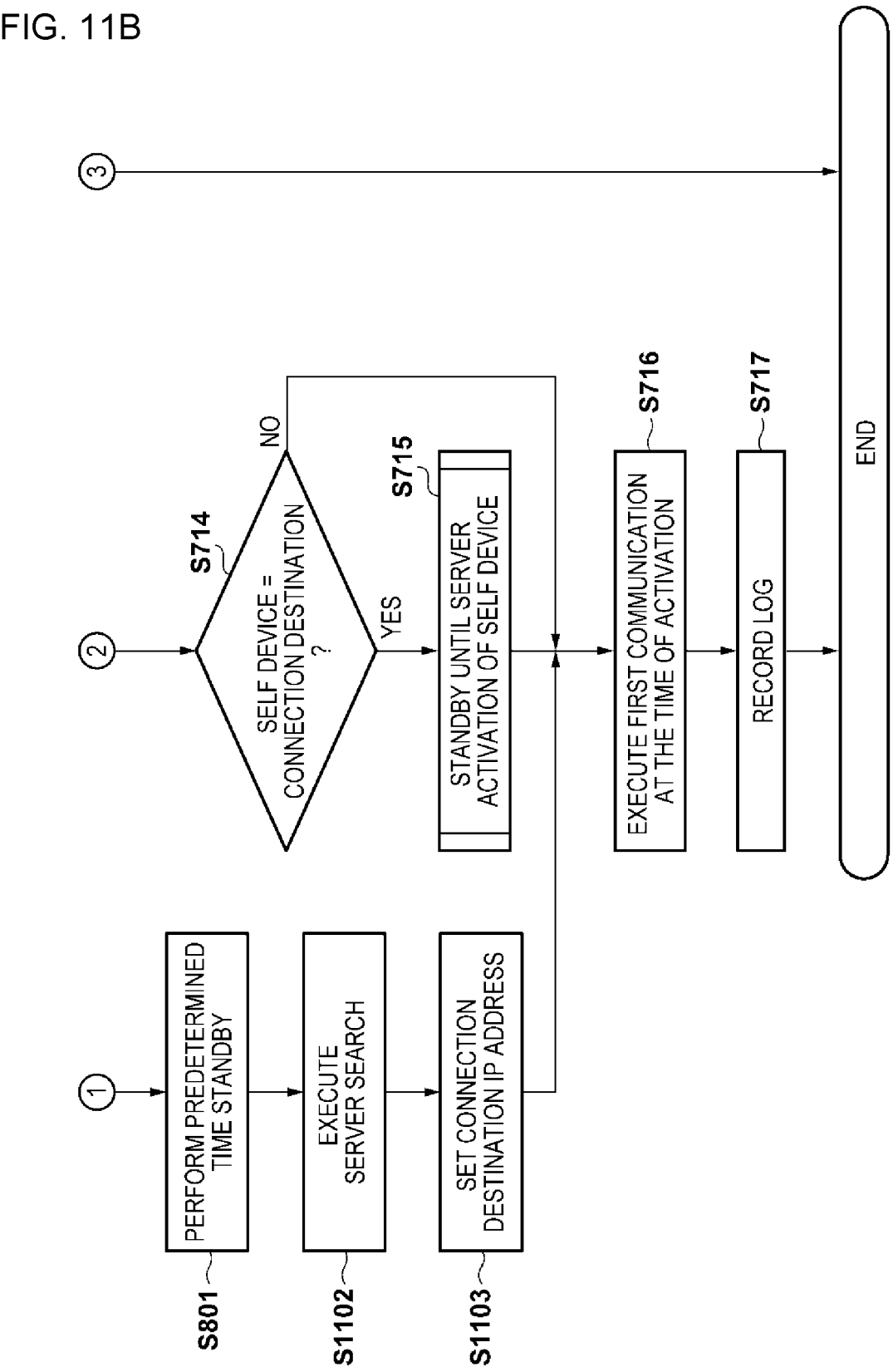
FIG. 11B is a flowchart showing the processing procedure of a setting management server 110 and a multifunction peripheral 120.

FIGS. 11A and 11B are flowcharts for explaining the processing procedure of setting synchronization communication at the time of startup of the multifunction peripheral 120 according to this embodiment. When the power button of the multifunction peripheral 120 is pressed and the startup is started, a setting synchronization client application 500 and a setting management server application 600 respectively execute steps S711 and S721. Next, the setting synchronization client application 500 executes processing in the previously described steps S712 and S713, and the process advances to step S1101. In step S1101, a control module 521 determines whether the IP address of the connection destination server is set. If no IP address of the connection destination server is set (NO in step S1101), the control module 521 notifies a timing management module 522 of this state, and the process advances to the previously described step S801. The processing in step S801 is the same as that in step S801 described in the first embodiment. Assume that the startup of the setting management server application 600 in step S721 is completed and the subsequent step S722 is completed while the processing in step S801 is performed. Subsequently, the process advances to step S1102, and the control module 521 instructs a communication processing module 523 to execute search processing for the connection destination server. Upon receiving this instruction, the communication processing module 523 executes the search processing of the connection destination server and notifies the control module 521 of the IP address of the discovered server, and the process advances to step S1103. As a method of search processing, for example, WS-Discovery or the like which executes a search by transmitting a multi-cast packet within a LAN can be considered, but as long as completion of the startup in step S721 for the setting management server 110 is satisfied as a condition for enabling a search, any practical method can be used. In step S1103, the control module 521 requests a cache data management module 510 to set the IP address of the discovered server, which the control module 521 was notified of from the communication processing unit 523, as the IP address of the connection destination server. Upon receiving this request, the cache data management module 510 sets the IP address of the discovered server as the IP address of the connection destination server. As a result of this processing, the IP address of the multifunction peripheral 120 and the IP address of the connection destination server set in the cache data 511 of the multifunction peripheral 120 are respectively set as the values shown in Table 10.

TABLE 10

| Key Identifier | Value | Last Update Date/Time |
|---|---|---|
| settings.my_ip_address | "123.456.789.012" | 2013/6/18/18:30 |
| settings.server_ip_address | "123.456.789.012" | 2013/7/8/10:49 |

Using the IP address of the connection destination server set in this manner, the processing described in step S716 is executed to execute the first synchronization communication at the time of startup with the setting management server application 600. Subsequently, step S717 is executed and the sequence ends. If the IP address of the connection destination server is already set in step S1101, the process branches to S714 and executes the same processing as the first embodiment.

By implementing the present invention by such a processing procedure, it becomes possible to implement an operation of immediately executing the standby processing, without implementing the procedure described in the first embodiment, in a situation where the connection destination is not determined and it is necessary for the startup of the setting management server to be completed for the confirmation. In addition, by implementing such an operation, it is possible to prevent a communication failure due to executing communication processing while the connection destination is still not determined.

Note that the second embodiment can also be applied to this embodiment, and the standby during steps S801 and S715 can be not for a predetermined time but for a reception of a startup completion notification from the setting management server 110.

Fourth Embodiment

In the previously described embodiments, determination of whether a setting management server is arranged in a multifunction peripheral is executed by determining whether the IP address of the multifunction peripheral and the IP address of the connection destination server are the same. This embodiment will describe, with reference to the drawings, how it is also possible to implement the present invention by setting an identifier, which indicates that the connection destination server is given by the same apparatus as the multifunction peripheral itself, as the IP address of the connection destination server and incorporating the presence/absence of this setting as a determination condition. Note that descriptions for the system arrangement, the hardware arrangement, the software configuration, the data structure, and the processing procedure of the embodiment will be omitted for sections that are the same as those described in the previously described embodiments and only sections that are different will be described.

Figure 12:
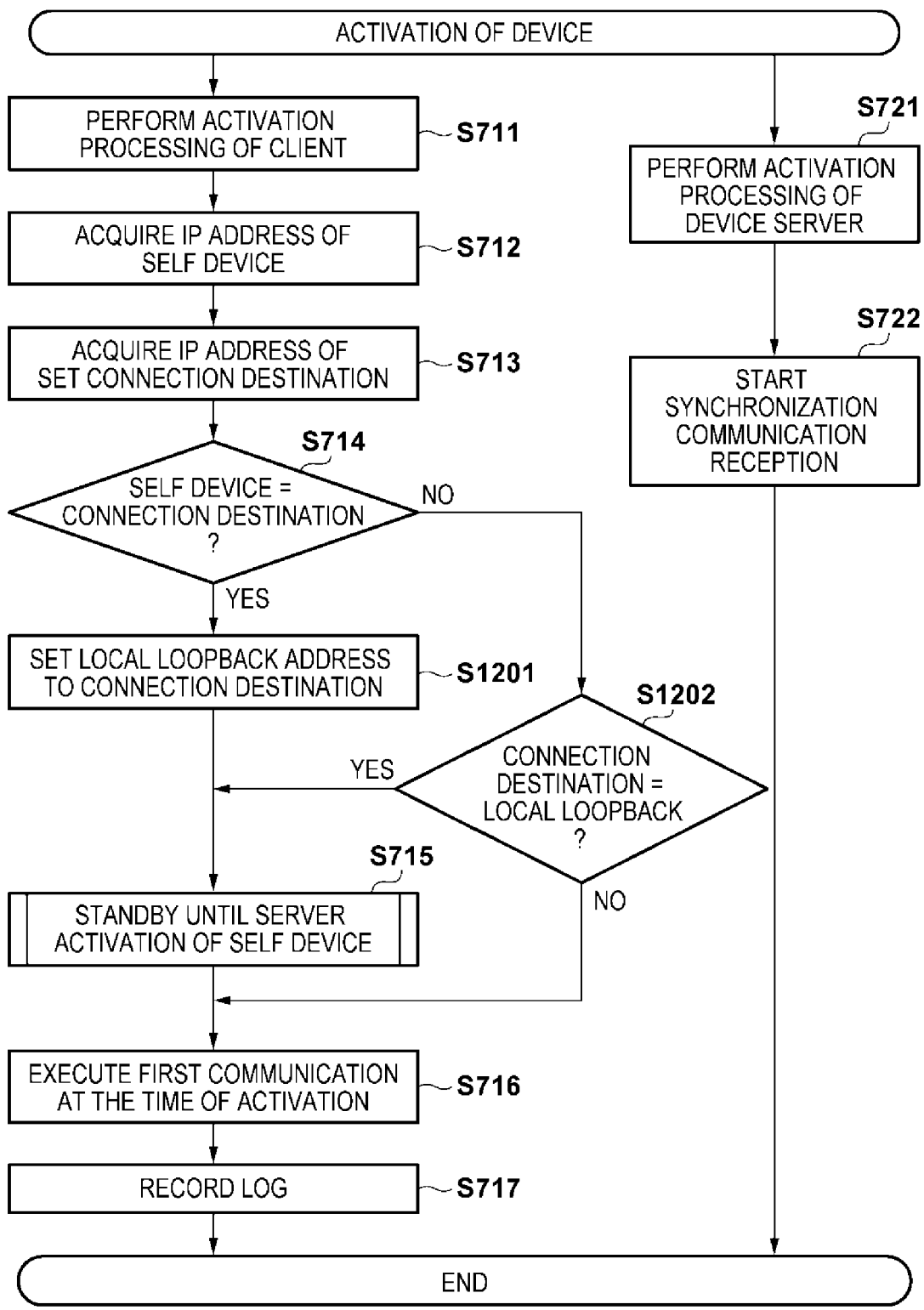
FIG. 12 is a flowchart showing the processing procedure of a setting management server 110 and a multifunction peripheral 120.

FIG. 12 is a flowchart for explaining the processing procedure of setting synchronization communication at the time of startup of a multifunction peripheral 120 according to this embodiment. Assume here that steps S711, S721, S712, S713, and S714 are executed according to this flowchart in the same state as that described in the first embodiment. Since the determination in step S714 is YES, the process advances to step S1201. In step S1201, a control module 521 requests a cache data management module 510 to update the IP address of a connection destination server having the same value as the apparatus itself, for example, the IP address of the connection destination server in cache data 511 in a state shown in Table 7, to a local backup address "127.0.0.1" as a predetermined value. Upon receiving this request, the cache data management module 510 updates the value of the IP address "settings.server_ip_address" of the connection destination server in the cache data 511 to the local loopback address "127.0.0.1". As a result of this processing, the IP address of the multifunction peripheral 120 and the IP address of the connection destination server set in the cache data 511 of the multifunction peripheral are respectively set as the values shown in Table 11.

TABLE 11

| Key Identifier | Value | Last Update Date/Time |
|---|---|---|
| settings.my_ip_address | "123.456.789.012" | 2013/6/18/18:30 |
| settings.server_ip_address | "127.0.0.1" | 2013/7/8/12:18 |

Next, steps S715, S716, and S717 previously described in the first embodiment are executed, and the sequence ends. An example of a case where the processing procedure shown in FIG. 12 is subsequently re-executed by, for example, implementing reactivation of the multifunction peripheral 120 will be described. First, steps S711, S721, S712, S713, and S714 are executed. If the IP address of the connection destination server has been rewritten once in step S1201, that is, in the state of Table 11, the determination in step S714 becomes NO from the next time, so the process advances to the subsequent step S1202. In step S1202, the control module 521 determines whether the IP address of the connection destination server acquired in step S713 is a local loopback address. Since the determination result is YES, steps S715 and S716 are sequentially executed, and the sequence ends.

Implementing the present invention by such a procedure has two effects. The first effect is that influence to the traffic of a network 100 can be reduced because the communication data is not sent out on the network 100 since the connection destination address used for the first synchronization communication processing at the time of startup in step S716 is the local loopback address. The second effect is that, in a case where the system on the network 100 is managed by a DHCP server, it can guarantee that a setting management server 110 is arranged in the multifunction peripheral itself even if the IP address assigned to the apparatus itself is changed before and after the reactivation of the multifunction peripheral 120. Note that a mode other than that described in this embodiment can be used as long as the local loopback address is an identifier which can determine that the connection destination server is arranged in the multifunction peripheral itself. For example, the value of "settings.server_ip_address" may be a character string such as "localhost", "this device", or the like or non-volatile information held in a file format in an HDD 305 can be the identifier. Note that, even in such cases, it is preferable to use a local loopback address as the IP address of the connection destination server.

Fifth Embodiment

As a modification of the first embodiment, it will be shown, with reference to the drawings, that meaningless failure log records, concerning the first communication at the time of startup when a setting management server is arranged in a multifunction peripheral, can be suppressed by implementing the present invention by a processing procedure different from those previously explained. Note that descriptions for the system arrangement, the hardware arrangement, the software configuration, the data structure, and the processing procedure of the embodiment will be omitted for sections that are the same as those described in the previously described embodiments and only sections that are different will be described.

Figure 14:
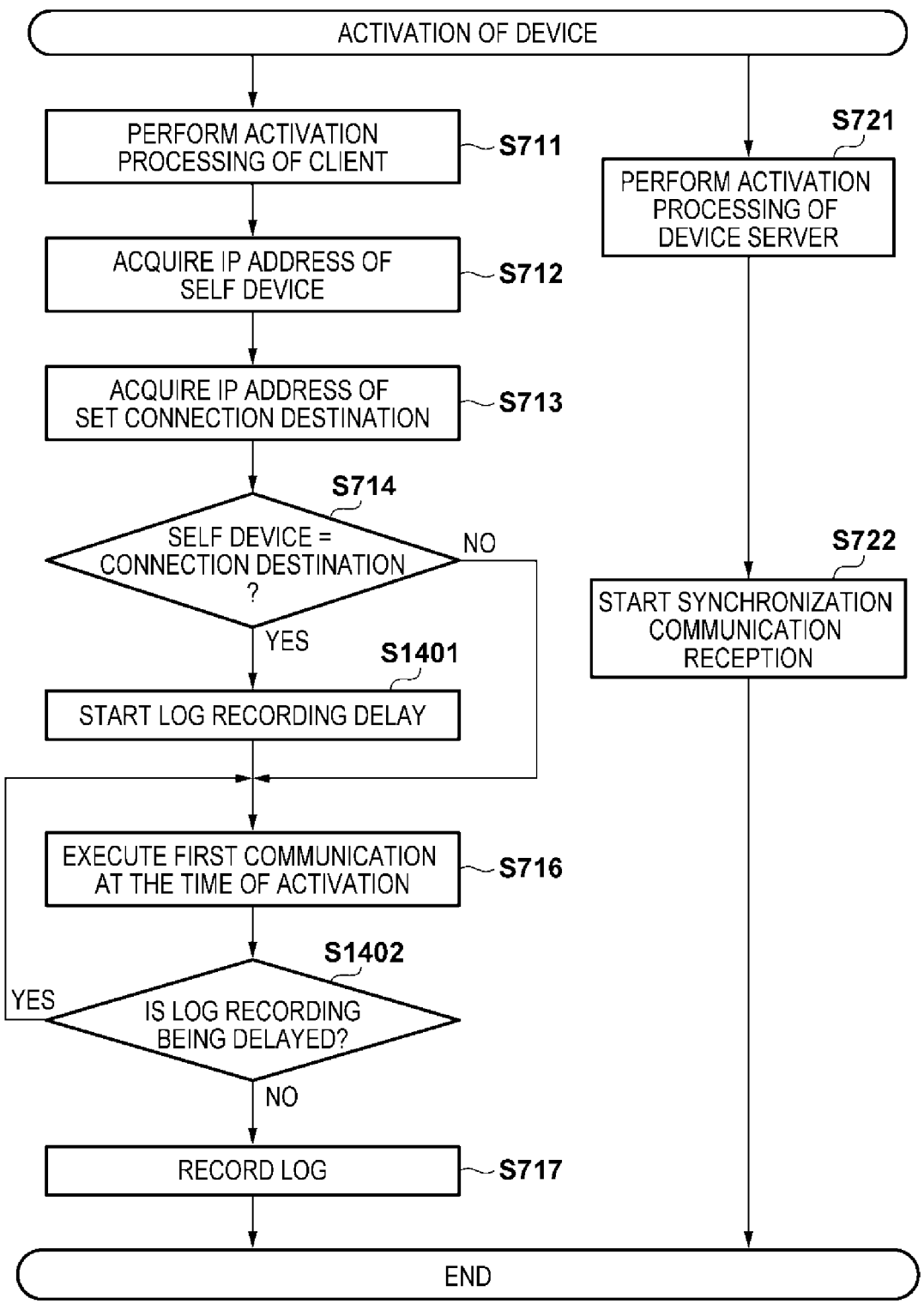
FIG. 14 is a flowchart showing the processing procedure of a setting management server 110 and a multifunction peripheral 120.

FIG. 14 is a flowchart for explaining the processing procedure of setting synchronization communication at the time of startup of a multifunction peripheral 120 according to the this embodiment. Assume here that steps S711, S721, S712, S713, and S714 are executed according to this flowchart in the same state as that described in the first embodiment. Since the determination in step S714 is YES, the process advances to step S1401. In step S1401, a control module 521 instructs a timing management module 522 to start a recording delay period for log information related to the synchronization communication, and the process advances to step S716.

Figure 15:
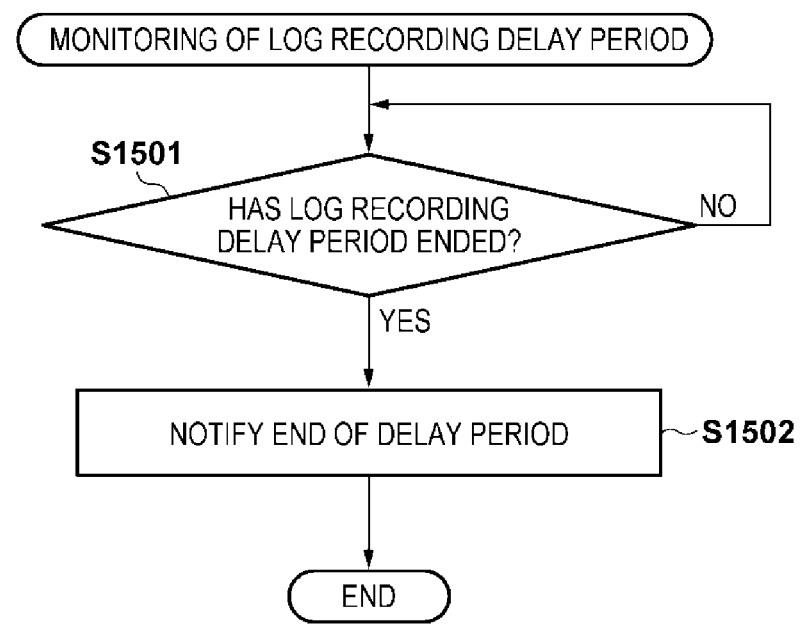
FIG. 15 is a flowchart showing the processing procedure of the multifunction peripheral 120.

FIG. 15 is a flowchart for explaining the procedure of the processing executed, in parallel with processing of the control module 521, by the timing management module 522 which receives the instruction to start the recording delay period. First, in step S1501, the timing management module 522 determines whether the recording delay period of the log information is completed. In this embodiment, it may be determined, after receiving instruction to start the log recording delay period from the control module 521, whether a predetermined time related to the processing in step S801 described in the first embodiment has elapsed. It may also be determined by monitoring a startup completion event of a setting management server application 600 by the processing in step S1001 explained in the third embodiment. If the determination in step S1501 is NO, the timing management module 522 continues the process in step S1501. On the other hand, if the determination in step S1501 is YES, the process advances to step S1502. In step S1502, the timing management module 522 notifies the control module 521 that the log recording delay period has ended, and the sequence of FIG. 15 ends.

The description returns to FIG. 14. Assume that the control module 521 is in a state to execute step S716 before the timing management module 522 executes step S1502 and before a communication processing module 622 of the setting management server application 600 executes step S722. Since it is a timing before step S722 is executed, first synchronization communication at the time of startup by a communication processing module 523 in step S716 fails. The control module 521 is notified of this failure, and the process advances to step S1402. In step S1402, the control module 521 determines whether it has received a completion notification of the log recording delay period from the timing management module 522. If no completion notification has been received yet (YES in step S1402), processes in steps S716 and S1402 are sequentially executed again. Assume that execution of steps S1502 and S722 is completed during this period. At this time, the synchronization communication process in step S716 succeeds, and in the subsequent step S1402, the control module 521 determines NO. In step S717, log information representing success of first synchronization communication at the time of startup is recorded, and the sequence of FIG. 14 ends.

By implementing the present invention by such a procedure, the frequency of meaningless failure history recordings caused by having the synchronization communication being performed before startup of the setting management server can be reduced.

Note that it can be arranged so that success of setting synchronization processing at the time of startup is determined immediately before step S1402. If it is successful, the process can skip step S1402 and branch to step S717. If it has failed, the process branches to step S1402. In this manner, it can be arranged so no errors caused by startup incompletion of a setting management server 110 installed in the same apparatus will be recorded.

Other Embodiments

Further, since synchronization target data is not limited to settings and is the same for other data, the present invention is applicable to data of a server after power-on and a client to be synchronized. Additionally, the contents of the first embodiment to the fifth embodiment can be combined and used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a National Stage Entry of International Application No. PCT/JP2015/004918, filed on Sep. 29, 2015, which claims the benefit of Japanese Patent Application No. 2014-223191, filed Oct. 31, 2014 which are hereby incorporated by reference herein in their entireties.

The invention claimed is:

1. An information processing apparatus comprising:
a storage configured to store target data and a program; and
a processor that executes the program, wherein the program is configured to cause the processor to perform:

in activation processing of the information processing apparatus, controlling to update master data managed by a server to reflect the target data;

determining, in the activation processing, whether the server is included in the information processing apparatus; and managing the controlling to
in a case where it is determined that the server is included in the information processing apparatus, wait for an activation completion notification from the server and start updating the master data to reflect the target data after receiving the activation completion notification from the server, and
in a case where it is determined that the server is not included in the information processing apparatus, start updating the master data to reflect the target data without receiving the activation completion notification from the server.

2. The apparatus according to claim 1,
wherein in the determining, the processor performs comparing of an address of the information processing apparatus and an address of the server and determining that the server is included in the information processing apparatus if the addresses match.

3. The apparatus according to claim 2,
wherein in the determining, the processor determines whether an address of a server is set before comparing the address of the information processing apparatus and the address of the server, and if the address is set, performs determining whether the server is included in the information processing, and if no address is set, acquiring the address by searching for a network server after elapse of a predetermined time.

4. The apparatus according to claim 1,
wherein in the determining, the processor performs comparing an address of the information processing apparatus with an address of the server, determining that the server is included in the information processing apparatus if the addresses match, and rewriting the address of the server with a predetermined value indicating the information processing apparatus, and wherein
in the determining, the processor further determines, if the address of the server is the predetermined value, that the server is included in the information processing apparatus.

5. The apparatus according to claim 1, wherein the processor performs delaying for a predetermined time the updating of the master data to reflect the target data until the activation processing of the information processing apparatus is completed.

6. The apparatus according to claim 1, wherein the processor further performs delaying of the updating of the master data to reflect the target data until an activation completion notification is received from the server.

7. The apparatus according to claim 1, wherein the processor further performs recording an update result as a log.

8. The information processing apparatus according to claim 7, wherein the processor further performs, if it is determined that the server is included in the information processing apparatus, no log recording for a predetermined period.

9. The apparatus according to claim 1, wherein the information processing apparatus is an image forming apparatus.

10. A non-transitory computer-readable medium storing a program therein for causing a computer in an information processing apparatus to execute:

a control procedure for controlling, in activation processing of the information processing apparatus, to update master data managed by a server to reflect target data;

a determination procedure for determining, in the activation processing, whether the server is included in the information processing apparatus; and a management procedure for managing the control procedure to,
in a case where it is determined that the server is included in the information processing apparatus, wait for an activation completion notification from the server and start updating the master data to reflect the target data after receiving the activation completion notification from the server, and
in a case where it is determined that the server is not included in the information processing apparatus, start updating the master data to reflect the target data without receiving the activation completion notification from the server.

11. A control method of an information processing apparatus, comprising:

in activation processing of the information processing apparatus, controlling to update master data managed by a server to reflect target data;

determining, in the activation processing, whether the server is included in the information processing apparatus; and managing the controlling to,
in a case where it is determined that the server is included in the information processing apparatus, wait for an activation completion notification from the server and start updating the master data to reflect the target data after receiving the activation completion notification from the server, and
in a case where it is determined that the server is not included in the information processing apparatus, start updating the master data to reflect the target data without receiving the activation completion notification from the server.

* * * * *